United States Patent
Bae et al.

(10) Patent No.: US 11,742,996 B2
(45) Date of Patent: Aug. 29, 2023

(54) METHOD, USER EQUIPMENT AND PROCESSING DEVICE FOR RECEIVING DOWNLINK CHANNEL, AND METHOD FOR TRANSMITTING DOWNLINK CHANNEL

(71) Applicant: LG Electronics Inc., Seoul (KR)

(72) Inventors: Duckhyun Bae, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/578,026

(22) Filed: Jan. 18, 2022

(65) Prior Publication Data
US 2022/0231798 A1    Jul. 21, 2022

Related U.S. Application Data

(60) Provisional application No. 63/137,762, filed on Jan. 15, 2021.

(51) Int. Cl.
*H04L 1/1829* (2023.01)
*H04L 5/00* (2006.01)

(52) U.S. Cl.
CPC .......... *H04L 1/1854* (2013.01); *H04L 5/0055* (2013.01)

(58) Field of Classification Search
CPC .............................. H04L 1/1854; H04L 5/0055
USPC ......................................................... 370/329
See application file for complete search history.

(56) References Cited

U.S. PATENT DOCUMENTS

| | | | | |
|---|---|---|---|---|
| 2020/0374089 | A1* | 11/2020 | Yang | H04L 5/001 |
| 2021/0352656 | A1* | 11/2021 | Choi | H04L 5/0055 |
| 2022/0007399 | A1* | 1/2022 | Rastegardoost | H04W 72/1273 |
| 2022/0038218 | A1* | 2/2022 | Kim | H04L 1/1893 |
| 2022/0095337 | A1* | 3/2022 | Wang | H04W 76/30 |

FOREIGN PATENT DOCUMENTS

| | | |
|---|---|---|
| KR | 20080097897 | 11/2008 |
| KR | 20140050666 | 4/2014 |

(Continued)

OTHER PUBLICATIONS

Zte, "Support additional PDSCH scheduling delay for introduction of 14-HARQ processes in DL for eMTC", R1-208698, Oct. 26-Nov. 13, 2020. (From Applicant's IDS) (Year: 2020).*

(Continued)

*Primary Examiner* — Mang Hang Yeung
(74) *Attorney, Agent, or Firm* — Fish & Richardson P.C.

(57) ABSTRACT

A user equipment (UE) may determine a first transmission time for a first hybrid automatic repeat request acknowledgement (HARQ-ACK) for a first downlink channel associated with a first HARQ process; and receive a second downlink channel associated with the first HARQ process. Receiving the second downlink channel for the first HARQ process may include: receiving the second downlink channel after the first transmission time based on the first HARQ-ACK being not subject to HARQ deferral; and receiving the second downlink channel after a second transmission time based on the first HARQ-ACK being subject to the HARQ deferral and the first transmission time being determined by the HARQ deferral from the second transmission time earlier than the first transmission time.

12 Claims, 12 Drawing Sheets

(56) References Cited

FOREIGN PATENT DOCUMENTS

KR        102186248       12/2020
WO     WO2015056946    4/2015

OTHER PUBLICATIONS

International Search Report in International Appln. No. PCT/KR2022/000821, dated May 18, 2022, 8 pages.
Zte, "Support additional PDSCH scheduling delay for introduction of 14-HARQ processes in DL for eMTC," R1-208698, Presented at 3GPP TSG RAN WG1 #103-e, e-Meeting, Oct. 26-Nov. 13, 2020, 4 pages.

* cited by examiner

METHOD, USER EQUIPMENT AND PROCESSING DEVICE FOR RECEIVING DOWNLINK CHANNEL, AND METHOD FOR TRANSMITTING DOWNLINK CHANNEL

CROSS-REFERENCE TO RELATED APPLICATIONS

The present application claims the benefit of an earlier filing date and right of priority to U.S. Provisional Application No. 63/137,762, filed on Jan. 15, 2021, the contents of which are herein incorporated by reference in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

In addition, appropriate scheduling constraints in relation to hybrid automatic repeat request (HARQ) processes need to be defined according to various scenarios.

The objects to be achieved with the present disclosure are not limited to what has been particularly described hereinabove and other objects not described herein will be more clearly understood by persons skilled in the art from the following detailed description.

In an aspect of the present disclosure, there is provided a method of receiving a downlink channel by a user equipment (UE) in a wireless communication system. The method may include: determining a first transmission time for a first hybrid automatic repeat request (HARQ)-acknowledgement (ACK) (HARQ-ACK) for a first downlink channel associated with a first HARQ process; and receiving a second downlink channel associated with the first HARQ process. Receiving the second downlink channel for the first HARQ process may include: receiving the second downlink channel after the first transmission time based on the first HARQ-ACK being not subject to HARQ deferral; and receiving the second downlink channel after a second transmission time based on the first HARQ-ACK being subject to the HARQ deferral and the first transmission time being determined by the HARQ deferral from the second transmission time earlier than the first transmission time.

In another aspect of the present disclosure, there is provided a UE for receiving a downlink channel in a wireless communication system. The UE may include: at least one transceiver; at least one processor; and at least one computer memory operably connected to the at least one processor and configured to store instructions that, when executed, cause the at least one processor to perform operations. The operations may include: determining a first transmission time for a first HARQ-ACK for a first downlink channel associated with a first HARQ process; and receiving a second downlink channel associated with the first HARQ process. Receiving the second downlink channel for the first HARQ process may include: receiving the second downlink channel after the first transmission time based on the first HARQ-ACK being not subject to HARQ deferral; and receiving the second downlink channel after a second transmission time based on the first HARQ-ACK being subject to the HARQ deferral and the first transmission time being determined by the HARQ deferral from the second transmission time earlier than the first transmission time.

In another aspect of the present disclosure, there is provided a processing device in a wireless communication system. The processing device may include: at least one processor; and at least one computer memory operably connected to the at least one processor and configured to store instructions that, when executed, cause the at least one processor to perform operations. The operations may include: determining a first transmission time for a first HARQ-ACK for a first downlink channel associated with a first HARQ process; and receiving a second downlink channel associated with the first HARQ process. Receiving the second downlink channel for the first HARQ process may include: receiving the second downlink channel after the first transmission time based on the first HARQ-ACK being not subject to HARQ deferral; and receiving the second downlink channel after a second transmission time based on the first HARQ-ACK being subject to the HARQ deferral and the first transmission time being determined by the HARQ deferral from the second transmission time earlier than the first transmission time.

In another aspect of the present disclosure, there is provided a computer-readable storage medium. The computer-readable storage medium may be configured to store at least one computer program including instructions that, when executed by at least one processor, cause the at least one processor to perform operations for a UE. The operations may include: determining a first transmission time for a first HARQ-ACK for a first downlink channel associated with a first HARQ process; and receiving a second downlink channel associated with the first HARQ process. Receiving the second downlink channel for the first HARQ process may include: receiving the second downlink channel after the first transmission time based on the first HARQ-ACK being not subject to HARQ deferral; and receiving the second downlink channel after a second transmission time based on the first HARQ-ACK being subject to the HARQ deferral and the first transmission time being determined by the HARQ deferral from the second transmission time earlier than the first transmission time.

In another aspect of the present disclosure, there is provided a computer program stored in a computer-readable storage medium. The computer program may include at least one program code including instructions that, when executed, cause at least one processor to perform operations. The operations may include: determining a first transmission time for a first HARQ-ACK for a first downlink channel associated with a first HARQ process; and receiving a second downlink channel associated with the first HARQ process. Receiving the second downlink channel for the first HARQ process may include: receiving the second downlink channel after the first transmission time based on the first HARQ-ACK being not subject to HARQ deferral; and receiving the second downlink channel after a second transmission time based on the first HARQ-ACK being subject to the HARQ deferral and the first transmission time being determined by the HARQ deferral from the second transmission time earlier than the first transmission time.

In another aspect of the present disclosure, there is provided a method of transmitting a downlink channel by a base station (BS) to a UE in a wireless communication system. The method may include: determining a first reception time for a first HARQ-ACK for a first downlink channel associated with a first HARQ process; and transmitting a second downlink channel associated with the first HARQ process. Transmitting the second downlink channel for the first HARQ process may include: transmitting the second downlink channel after the first reception time based on the first HARQ-ACK being not subject to HARQ deferral; and transmitting the second downlink channel after a second reception time based on the first HARQ-ACK being subject to the HARQ deferral and the first reception time being determined by the HARQ deferral from the second reception time earlier than the first reception time.

In another aspect of the present disclosure, a BS configured to transmit a downlink channel to a UE in a wireless communication system is provided. The BS may include: at least one transceiver; at least one processor; and at least one computer memory operably connected to the at least one processor and configured to store instructions that, when executed, cause the at least one processor to perform operations. The operations may include: determining a first reception time for a first HARQ-ACK for a first downlink channel associated with a first HARQ process; and transmitting a second downlink channel associated with the first HARQ process. Transmitting the second downlink channel for the first HARQ process may include: transmitting the second downlink channel after the first reception time based on the first HARQ-ACK being not subject to HARQ deferral; and transmitting the second downlink channel after a second reception time based on the first HARQ-ACK being subject to the HARQ deferral and the first reception time being determined by the HARQ deferral from the second reception time earlier than the first reception time.

In each aspect of the present disclosure, based on the first HARQ-ACK being subject to the HARQ deferral and the first transmission time being determined by the HARQ deferral from the second transmission time, the second downlink channel may start before an end of the first transmission time.

In each aspect of the present disclosure, the first downlink channel may be a semi-persistent scheduling (SPS) based physical downlink shared channel (PDSCH).

In each aspect of the present disclosure, the second downlink channel may be for retransmission of a transport block included in the SPS based PDSCH.

In each aspect of the present disclosure, the second downlink channel may be a dynamic scheduling based PDSCH.

In each aspect of the present disclosure, the operations of the UE may include: determining a third transmission time for a second HARQ-ACK for the second downlink channel; dropping transmission of the first HARQ-ACK within the first transmission time; and transmitting the second HARQ-ACK at the third transmission time.

The foregoing solutions are merely a part of the examples of the present disclosure and various examples into which the technical features of the present disclosure are incorporated may be derived and understood by persons skilled in the art from the following detailed description.

According to some implementations of the present disclosure, a wireless communication signal may be efficiently transmitted/received. Accordingly, the total throughput of a wireless communication system may be raised.

According to some implementations of the present disclosure, various services with different requirements may be efficiently supported in a wireless communication system.

According to some implementations of the present disclosure, delay/latency generated during radio communication between communication devices may be reduced.

According to some implementations of the present disclosure, it is possible to prevent the latency of the entire system from increasing due to scheduling constraints in relation to hybrid automatic repeat request (HARQ) processes According to some implementations of the present specification, a base station may be allowed to schedule other transmissions as needed, thereby improving the scheduling flexibility of the BS and reducing the delay of the entire system.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure.

DETAILED DESCRIPTION

Figure 1:
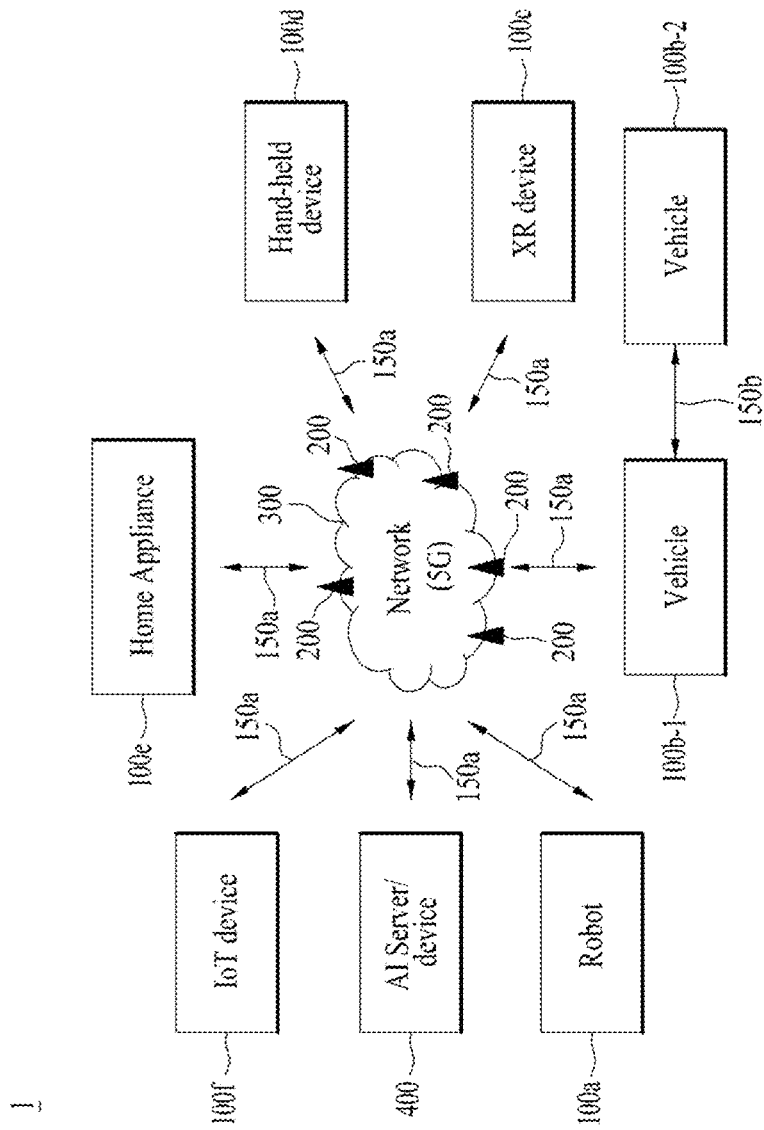
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. PSCell is a primary Scell of an SCG. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., resource elements (REs)) that is a set of REs that carry downlink control information (DCI), and the PDSCH refers to a set of time-frequency resources that is a set of REs that carry DL data. The PUCCH, PUSCH, and PRACH refer to a set of time-frequency resources that is a set of time-frequency REs that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In this specification, a radio resource (e.g., a time-frequency resource) scheduled or configured to the UE by the BS for transmission or reception of the PUCCH/PUSCH/PDSCH may be referred to as a PUCCH/PUSCH/PDSCH resource.

Since a communication device receives an SS/PBCH resource block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, reception of physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
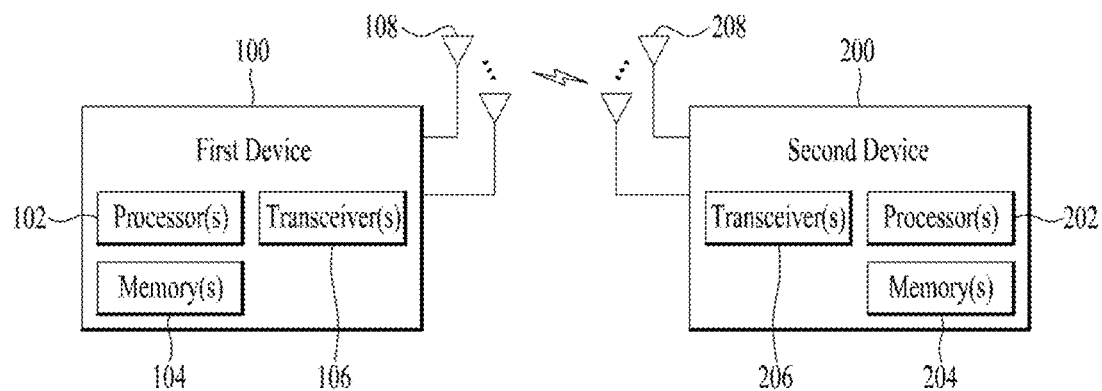
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technology implemented in the wireless devices XXX and YYY of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices XXX and YYY of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
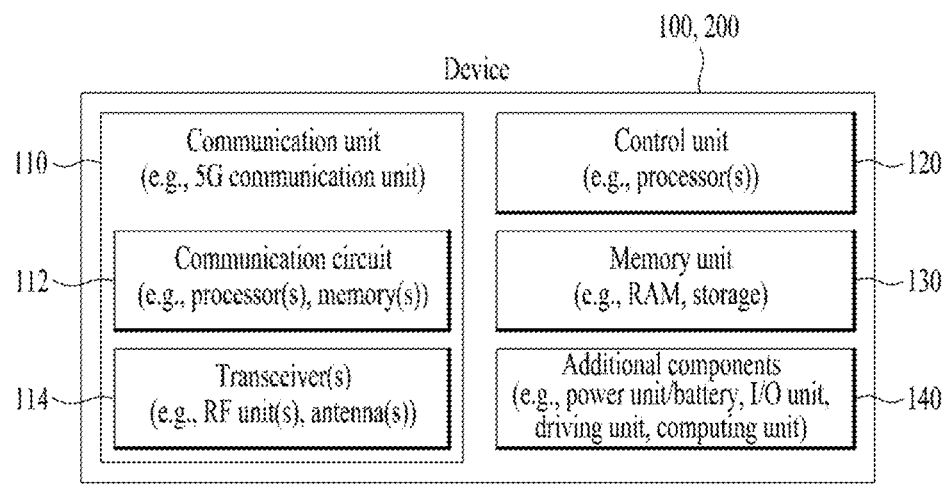
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-volatile) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-volatile) storage medium.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
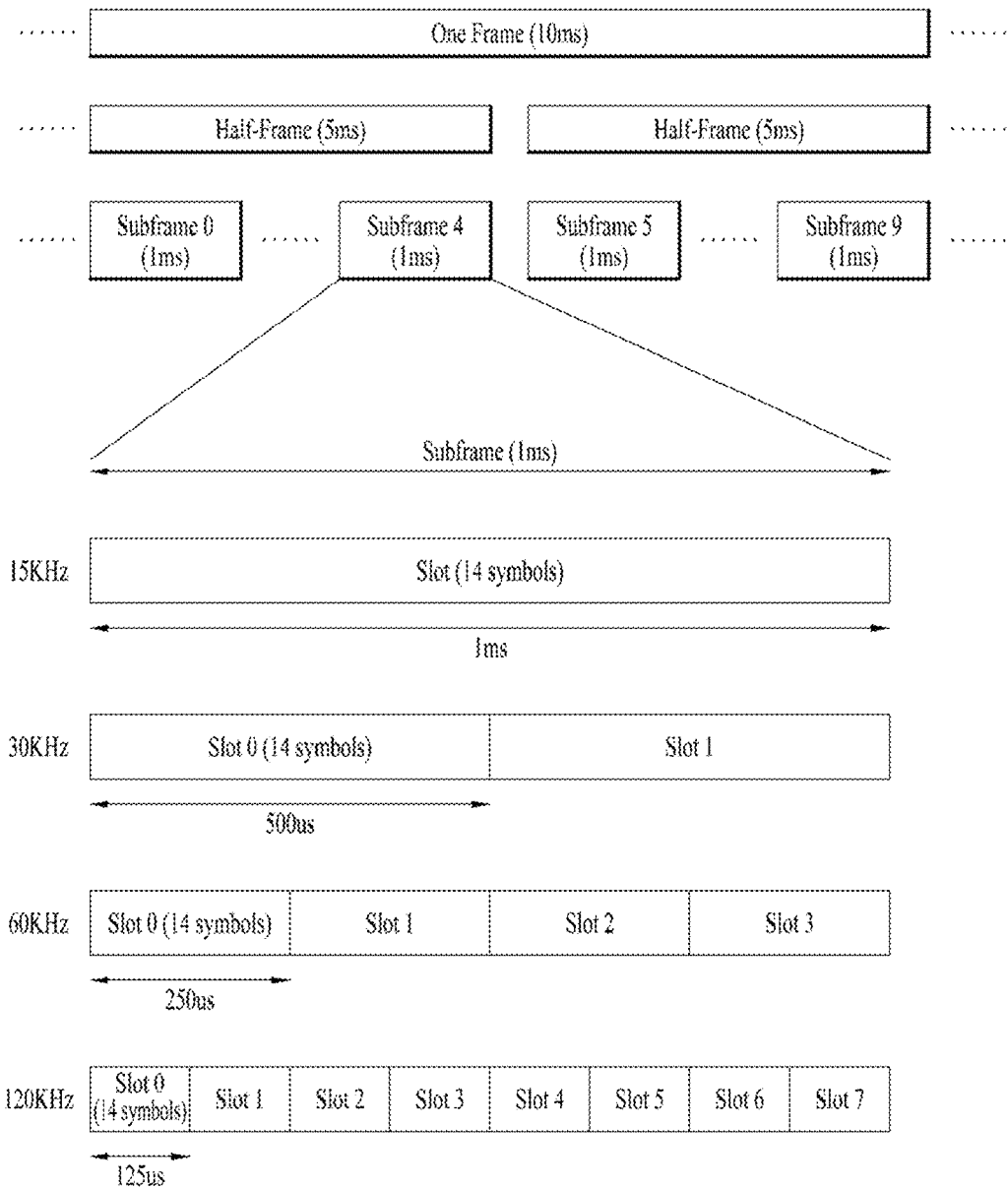
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f = (\Delta f_{max} * N_f / 100) * T_c = 10$ ms and is divided into two half-frames of 5 ms each. A basic time unit for NR is $T_c = 1/(\Delta f_{max} * N_f)$ where $\Delta f_{max} = 480 * 10^3$ Hz and $N_f = 4096$. For reference, a basic time unit for LTE is $T_s = 1/(\Delta f_{ref} * N_{f,ref})$ where $\Delta f_{ref} = 15 * 10^3$ Hz and $N_{f,ref} = 2048$. $T_c$ and $T_f$ have the relationship of a constant $\kappa = T_s/T_c = 64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

For a subcarrier spacing configuration u, slots may be indexed within a subframe in ascending order as follows: $n^u_s \in \{0, \ldots, n^{subframe,u}_{slot} - 1\}$ and indexed within a frame in ascending order as follows: $n^u_{s,f} \in \{0, \ldots, n^{frame,u}_{slot} - 1\}$.

Figure 5:
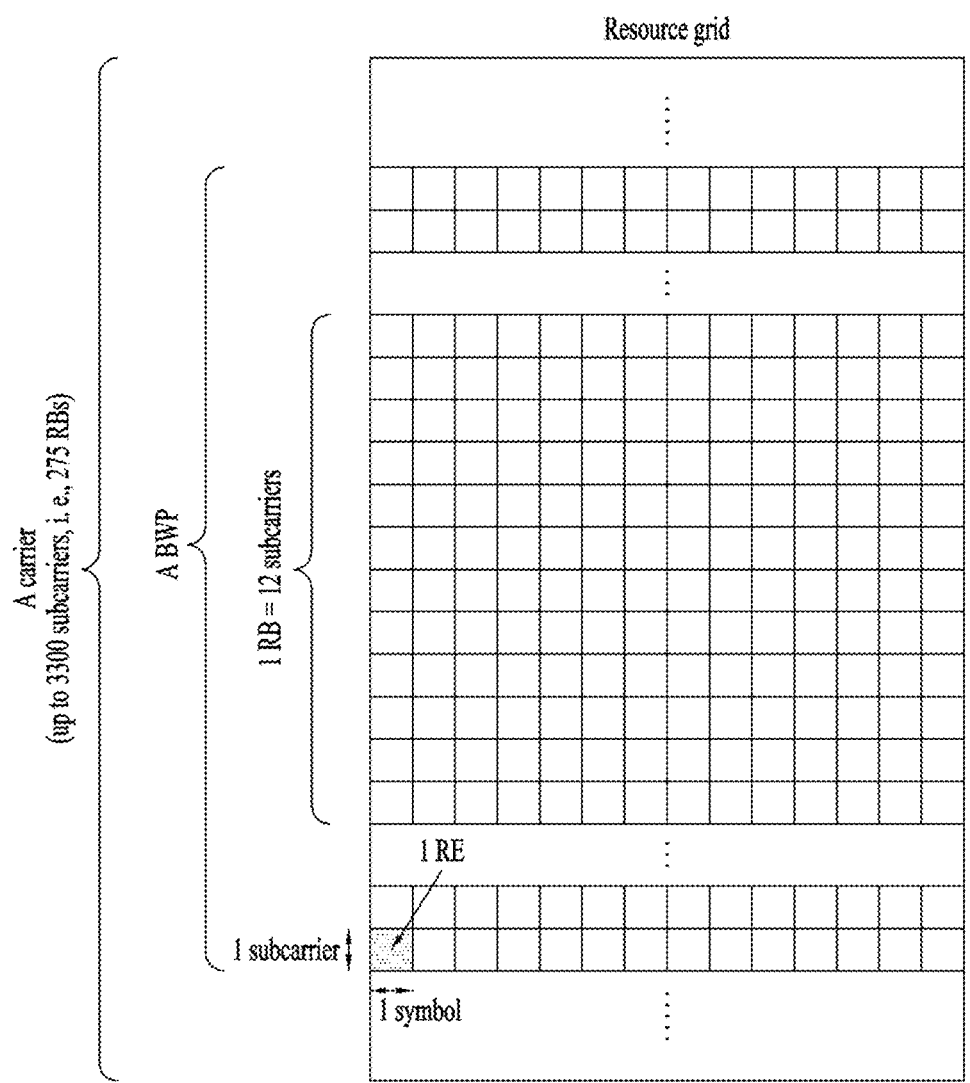
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB} = n^u_{CRB} + N^{size,u}_{BWP,i}$, where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided the following parameters for the serving cell: i) an SCS; ii) a CP; iii) a CRB $N^{start}_{BWP} = O_{carrier} + RB_{start}$ and the number of contiguous RBs $N^{size}_{BWP} = L_{RB}$ provided by an RRC parameter locationAndBandwidth, which indicates an offset $RB_{set}$ and a length $L_{RB}$ as a resource indicator value (RIV) on the assumption of $N^{start}_{BWP} = 275$, and a value $O_{carrier}$ provided by an RRC parameter offsetToCarrier for the SCS; an index in the set of DL BWPs or UL BWPs; a set of BWP-common parameters; and a set of BWP-dedicated parameters.

Virtual resource blocks (VRBs) may be defined within the BWP and indexed from 0 to $N^{size,u}_{BWP,i}-1$, where i denotes a BWP number. The VRBs may be mapped to PRBs according to non-interleaved mapping. In some implementations, VRB n may be mapped to PRB n for non-interleaved VRB-to-PRB mapping.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

Figure 6:
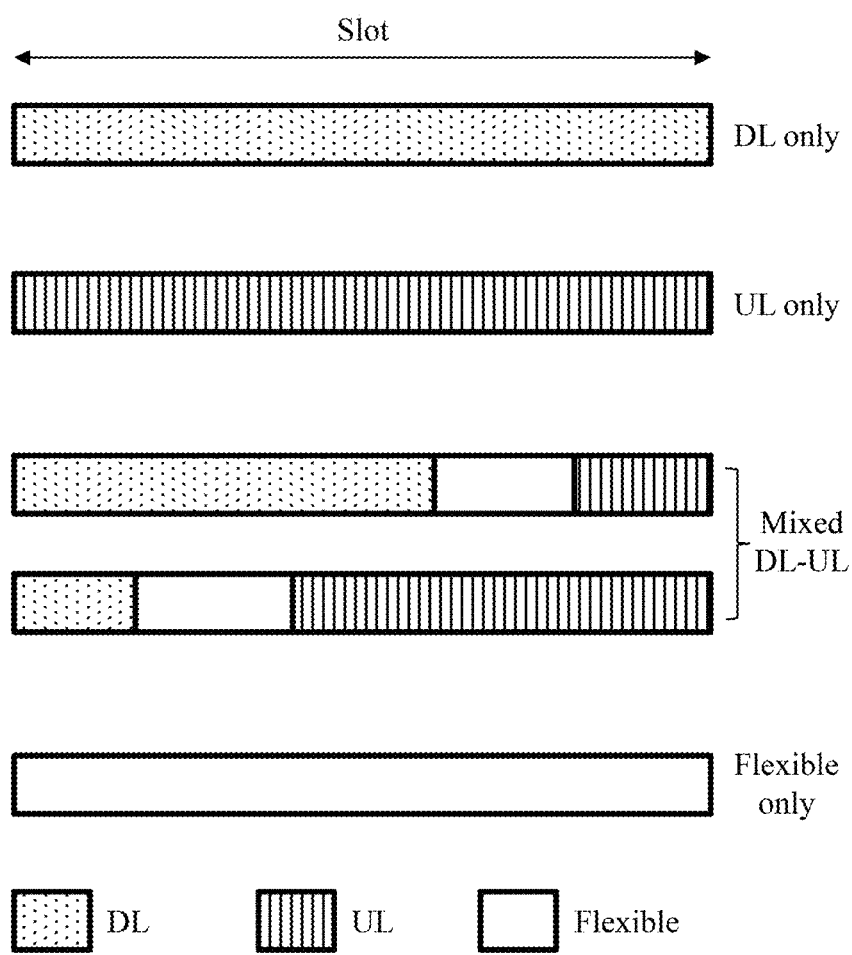
FIG. 6 illustrates slot structures used in a 3GPP-based system.

FIG. 6 illustrates slot structures used in a 3GPP-based system. In all 3GPP-based systems, for example, in an NR system, each slot may have a self-contained structure including i) a DL control channel, ii) DL or UL data, and/or iii) a UL control channel. For example, the first N symbols in a slot may be used to transmit the DL control channel (hereinafter, DL control region) and the last M symbols in a slot may be used to transmit the UL control channel (hereinafter, UL control region), where N and M are integers other than negative numbers. A resource region (hereinafter, data region) between the DL control region and the UL control region may be used to transmit DL data or UL data. Symbols in a single slot may be divided into group(s) of consecutive symbols that may be used as DL symbols, UL symbols, or flexible symbols. Hereinbelow, information indicating how each symbol in slot(s) is used will be referred to as a slot format. For example, which symbols in slot(s) are used for UL and which symbols in slot(s) are used for DL may be defined by a slot format.

When a BS intends to operate a serving cell in time division duplex (TDD) mode, the BS may configure a pattern for UL and DL allocation for the serving cell through higher layer (e.g., RRC) signaling. For example, the following parameters may be used to configure a TDD DL-UL pattern:

- dl-UL-TransmissionPeriodicity that provides a periodicity of the DL-UL pattern;
- nrofDownlinkSlots that provides the number of consecutive full DL slots at the beginning of each DL-UL pattern, where the full DL slots are slots having only DL symbols;
- nrofDownlinkSymbols that provides the number of consecutive DL symbols at the beginning of a slot immediately following the last full DL slot;
- nrofUplinkSlots that provides the number of consecutive full UL slots at the end of each DL-UL pattern, where the full UL slots are slots having only UL symbols; and
- nrofUplinkSymbols that provides the number of consecutive UL symbols in the end of a slot immediately preceding the first full UL slot.

The remaining symbols that are not configured as either DL symbols or UL symbols among symbols in the DL-UL pattern are flexible symbols.

If the UE is provided with a configuration for the TDD DL-UL pattern, i.e., a TDD UL-DL configuration (e.g., tdd-UL-DL-ConfigurationCommon, or tdd-UL-DLConfigurationDedicated), through higher layer signaling, the UE sets a slot format per slot over a number of slots based on the configuration.

For symbols, although there may be various combinations of DL symbols, UL symbols, and flexible symbols, a predetermined number of combinations may be predefined as slot formats and the predefined slot formats may be respectively identified by slot format indexes. The following table shows a part of the predefined slot formats. In the table below, D denotes a DL symbol, U denotes a UL symbol, and F denotes a flexible symbol.

TABLE 3

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |

TABLE 3-continued

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | F |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| ... | | | | | | | ... | | | | | | | |

To indicate which slot format is used in a specific slot among the predefined slot formats, the BS may configure a set of slot format combinations applicable to a corresponding serving cell per cell with respect to a set of serving cells through higher layer (e.g., RRC) signaling and cause the UE to monitor a group-common PDCCH for slot format indicator(s) (SFI(s)) through higher layer (e.g., RRC) signaling. Hereinafter, DCI carried by the group-common PDCCH for the SFI(s) will be referred to as SFI DCI. DCI format 2_0 is used as the SFI DCI. For example, for each serving cell in a set of serving cells, the BS may provide the UE with the (start) position of a slot format combination ID (i.e., SFI-index) for a corresponding serving cell in the SFI DCI, a set of slot format combinations applicable to the serving cell, and a reference subcarrier spacing configuration for each slot format in a slot format combination indicated by an SFI-index value in the SFI DCI. One or more slot formats are configured for each slot format combination in the set of the slot format combinations and the slot format combination ID (i.e., SFI-index) is assigned to the slot format combination. For example, when the BS intends to configure the slot format combination with N slot formats, N slot format indexes among slot format indexes for the predefined slot formats (e.g., see Table 3) may be indicated for the slot format combination. In order to configure the UE to monitor the group-common PDCCH for the SFIs, the BS informs the UE of an SFI-RNTI corresponding to an radio network temporary identifier (RNTI) used for an SFI and the total length of a DCI payload scrambled with the SFI-RNTI. Upon detecting the PDCCH based on the SFI-RNTI, the UE may determine slot format(s) for the corresponding serving cell from an SFI-index for the serving cell among SFI-indexes in the DCI payload in the PDCCH.

Symbols indicated as flexible symbols by the TDD DL-UL pattern configuration may be indicated as UL symbols, DL symbols, or flexible symbols by the SFI DCI. Symbols indicated as the DL/UL symbols by the TDD DL-UL pattern configuration are not overridden as the UL/DL symbols or the flexible symbols by the SFI DCI.

If the TDD DL-UL pattern is not configured, the UE determines whether each slot is used for UL or DL and determines symbol allocation in each slot based on the SFI DCI and/or on DCI for scheduling or triggering DL or UL signal transmission (e.g., DCI format 1_0, DCI format 1_1, DCI format 1_2, DCI format 0_0, DCI format 0_1, DCI format 0_2, or DCI format 2_3).

NR frequency bands are defined as two types of frequency ranges, i.e., FR1 and FR2. FR2 is also referred to as millimeter wave (mmW). The following table shows frequency ranges within which NR may operate.

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including resource allocation information on the DL-SCH is called PDSCH scheduling DCI, and DCI including resource allocation information on the UL-SCH is called PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH is a physical layer UL channel for uplink control information (UCI) transmission. The PUCCH carries UCI. UCI types transmitted on the PUCCH include hybrid automatic repeat request acknowledgement (HARQ-ACK) information, a scheduling request (SR), and channel state information (CSI). UCI bits include HARQ-ACK information bits if present, SR information bits if present, link recovery request (LRR) information bits if present, and CSI bits if present. In the present disclosure, HARQ-ACK information bits correspond to a HARQ-ACK codebook. In particular, a bit sequence in which HARQ-ACK information bits are arranged according to a predetermined rule is called a HARQ-ACK codebook.

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (L1). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

Link recovery request (LRR)

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 5.

(0) PUCCH format 0 (PF0 or F0)
Supported UCI payload size: up to K bits (e.g., K=2)
Number of OFDM symbols constituting a single PUCCH: 1 to X symbols (e.g., X=2)
Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.
Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH format 1 (PF1 or F1)
Supported UCI payload size: up to K bits (e.g., K=2)
Number of OFDM symbols constituting a single PUCCH: Y to Z symbols (e.g., Y=4 and Z=14)
Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.
Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH format 2 (PF2 or F2)
Supported UCI payload size: more than K bits (e.g., K=2)
Number of OFDM symbols constituting a single PUCCH: 1 to X symbols (e.g., X=2)
Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.
Configuration for PUCCH format 2 includes the following parameters for a corresponding PUCCH resource: the number of PRBs, the number of symbols for PUCCH transmission, and/or the first symbol for PUCCH transmission.

(3) PUCCH format 3 (PF3 or F3)
Supported UCI payload size: more than K bits (e.g., K=2)
Number of OFDM symbols constituting a single PUCCH: Y to Z symbols (e.g., Y=4 and Z=14)

Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH format 4 (PF4 or F4)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 5

| PUCCH format | Length in OFDM symbols $N^{PUCCH}_{symb}$ | Number of bits | Usage | Etc. |
| --- | --- | --- | --- | --- |
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2
PUCCH resource set #1, if 2< the number of UCI bits=<$N_1$
...
PUCCH resource set #(K−1), if $N_{K-2}$< the number of UCI bits=<$N_{K-1}$ Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 6).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

Resource Allocation by PDCCH: Dynamic Grant/Assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. HARQ information on a DL-SCH or UL-SCH may include a new information indicator (NDI), transport block size (TBS), redundancy version (RV), and HARQ process ID (i.e., HARQ process number). The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 7:
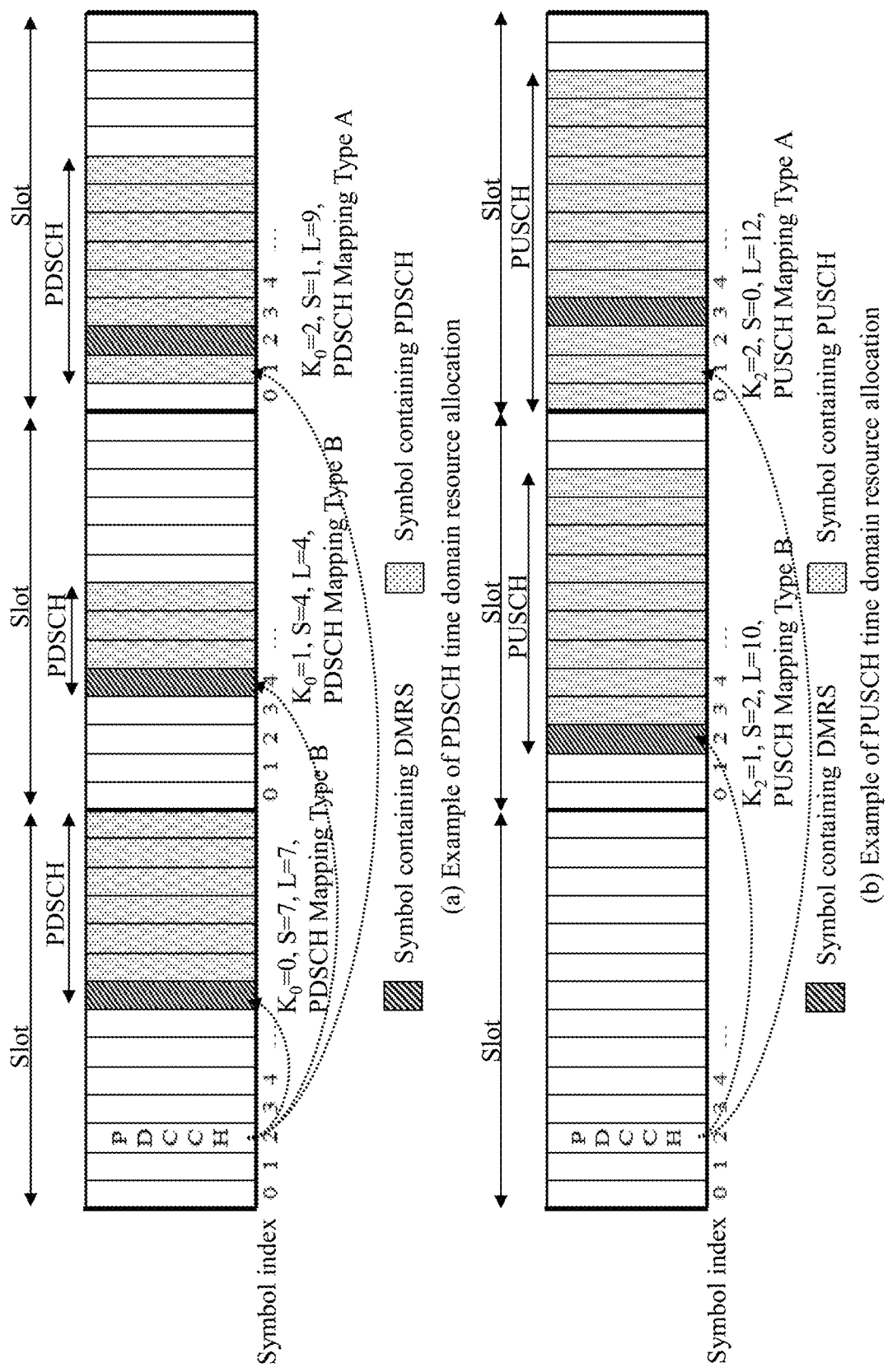
FIG. 7 illustrates an example of physical downlink shared channel (PDSCH) time domain resource assignment (TDRA) caused by a physical downlink control channel (PDCCH) and an example of physical uplink shared channel (PUSCH) TDRA caused by the PDCCH.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index 5) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index 5) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. There are two PDSCH/PUSCH mapping types: one is mapping type A and the other is mapping type B. In the case of PDSCH/PUSCH mapping type A, a DMRS is mapped to a PDSCH/PUSCH resource with respect to the start of a slot. One or two of the symbols of the PDSCH/PUSCH resource may be used as DMRS symbol(s) according to other DMRS parameters. For example, in the case of PDSCH/PUSCH mapping type A, the DMRS is located in the third symbol (symbol #2) or the fourth symbol (symbol #3) in the slot according to RRC signaling. In the case of PDSCH/PUSCH mapping type B, a DMRS is mapped with respect to the first OFDM symbol of a PDSCH/PUSCH resource. One or two symbols from the first symbol of the PDSCH/PUSCH resource may be used as DMRS symbol(s) according to other DMRS parameters. For example, in the case of PDSCH/PUSCH mapping type B, the DMRS is located at the first symbol allocated for the PDSCH/PUSCH. In the present disclosure, the PDSCH/PUSCH mapping type may be referred to as a mapping type or a DMRS mapping type. For example, in this specification, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:

cs-RNTI corresponding to a CS-RNTI for retransmission;

periodicity corresponding to a periodicity of configured grant Type 1;

timeDomainOffset indicating an offset of a resource with respect to system frame number (SFN)=0 in the time domain;

timeDomainAllocation value m that provides a row index m+1 pointing to the allocation table, indicating a combination of the start symbol S, the length L, and the PUSCH mapping type;

frequencyDomainAllocation that provides frequency domain resource allocation; and mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIT) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame* numberOfSymbolsPerSlot)+symbol number in the slot]= (timeDomainOffset*numberOfSymbolsPerSlot+S+N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:

cs-RNTI corresponding to a CS-RNTI for activation, deactivation, and retransmission; and periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying: [(SFN*numberOfSlotsPerFrame*numberOfSymbolsPerSlot)+(slot number in the frame*numberOfSymbolsPerSlot)+symbol number in the slot]=[SFN$_{start\ time}$*numberOfSlotsPerFrame*numberOfSymbolsPerSlot+slot$_{start\ time}$*numberOfSymbolsPerSlot+symbol$_{start\ time}$)+N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset and/or a parameter harq-ProcID-Offset2 used to derive HARQ process IDs for configured UL grants may be further provided by the BS to the UE. harq-ProcID-Offset is an offset of a HARQ process for a configured grant for operation with shared spectrum channel access, and harq-ProcID-Offset2 is an offset of a HARQ process for a configured grant. In the present disclosure, cg-RetransmissionTimer is a duration after (re)transmission based on a configured grant in which the UE should not autonomously perform retransmission based on the HARQ process of the (re)transmission. cg-Retransmission Timer may be provided to the UE by the BS when retransmission on a configured UL grant is configured. For configured grants configured with neither harq-ProcID-Offset nor cg-Retransmission Timer, the HARQ process ID associated with the first symbol of UL transmission may be derived from the following equation: HARQ Process ID= [floor(CURRENT_symbol/periodicity)] modulo nrofHARQ-Processes. For configured UL grants with harq-ProcID-Offset2, the HARQ process ID associated with the first symbol of UL transmission may be derived from the following equation: HARQ Process ID=[floor(CURRENT_symbol/periodicity)] modulo nrofHARQ-Processes+harq-ProcID-Offset2, where CURRENT_symbol=(SFN*numberOfSlotsPerFrame*numberOfSymbolsPerSlot+slot number in the frame*numberOfSymbolsPerSlot+symbol number in the slot), and numberOfSlotsPerFrame and numberOfSymbolsPerSlot denote the number of consecutive slots per frame and the number of consecutive OFDM symbols per slot, respectively. For configured UL grants with cg-Retransmission Timer, the UE may select a HARQ process ID from among HARQ process IDs available for the configured grant configuration.

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling (e.g., SPS configuration) used to configure a semi-persistent transmission:

cs-RNTI corresponding to a CS-RNTI for activation, deactivation, and retransmission;

nrofHARQ-Processes that provides the number of HARQ processes for SPS;

periodicity that provides a periodicity of configured DL assignment for SPS;

n1PUCCH-AN that provides a HARQ resource for a PUCCH for SPS (the network configures the HARQ resource as format 0 or format 1, and the actual PUCCH resource is configured by PUCCH-Config and referred to in n1PUCCH-AN by the ID thereof).

Multiple DL SPS configurations may be configured within the BWP of a serving cell. After DL assignment is configured for SPS, the UE may consider sequentially that N-th DL assignment occurs in a slot satisfying: (numberOfSlotsPerFrame*SFN+slot number in the frame)= [(numberOfSlotsPerFrame*SFN$_{start\ time}$+slot$_{start\ time}$)+N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset used to derive HARQ process IDs for configured DL assignments may be further provided by the BS to the UE. harq-ProcID-Offset is an offset of a HARQ process for SPS. For configured DL assignments without harq-ProcID-Offset, a HARQ process ID associated with a slot in which DL transmission starts may be determined from the following equation: HARQ Process ID=[floor (CURRENT_slot*10/(numberOfSlotsPerFrame*periodicity))] modulo nrofHARQ-Processes, where CURRENT_slot=[(SFN*number OfSlotsPerFrame)+slot number in the frame], and numberOfSlotsPer- Frame denotes the number of consecutive slots per frame. For configured DL assignments with harq-ProcID-Offset, a HARQ process ID associated with a slot in which DL transmission starts may be determined from the following equation: HARQ Process ID=[floor (CURRENT_slot/periodicity)] modulo nrofHARQ-Processes+harq-ProcID-Offset, where CURRENT_slot=[(SFN*numberOfSlots- PerFrame)+slot number in the frame], and number OfSlotsPerFrame denotes the number of consecutive slots per frame.

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 7 and Table 8. Table 7 shows an example of special fields for DL SPS and UL grant Type 2 scheduling activation PDCCH validation, and Table 8 shows an example of special fields for DL SPS and UL grant Type 2 scheduling release PDCCH validation.

TABLE 6

|  | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 7

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

In the present disclosure, a PDSCH based on DL SPS may be referred to as an SPS PDSCH, and a PUSCH based on a UL configured grant (CG) may be referred to as a CG PUSCH. A PDSCH dynamically scheduled by DCI carried on a PDCCH may be referred to as a dynamic grant (DG) PDSCH, and a PUSCH dynamically scheduled by DCI carried by on a PDCCH may be referred to as a DG PUSCH.

Figure 8:
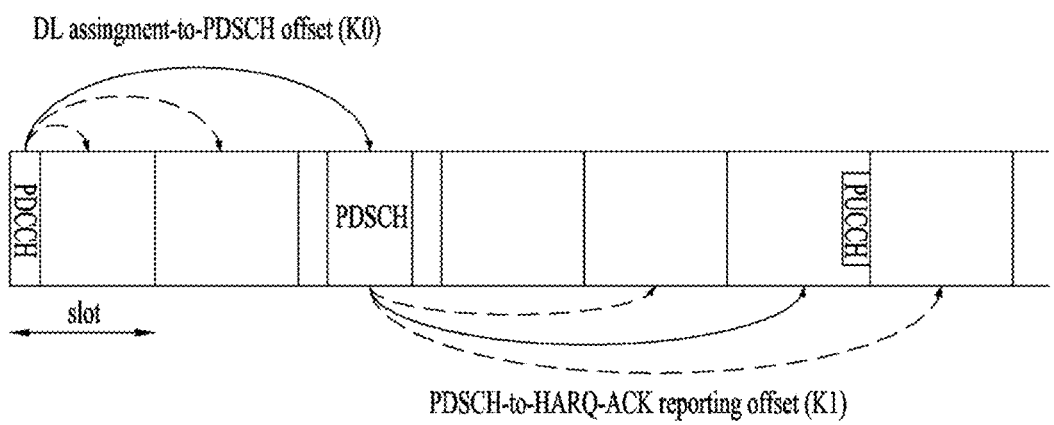
FIG. 8 illustrates a hybrid automatic repeat request-acknowledgement (HARQ-ACK) transmission/reception procedure.

FIG. 8 illustrates a HARQ-ACK transmission/reception procedure.

Referring to FIG. 8, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.

- FDRA: FDRA indicates an RB set allocated to the PDSCH.
- TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.
- PDSCH-to-HARQ feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as i) a semi-static HARQ-ACK codebook, ii) a dynamic HARQ-ACK codebook and iii) HARQ process based HARQ-ACK codebook, according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, the HARQ-ACK information for the PDSCH may be transmitted in slot #(m+k). As an example, k∈{1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ- ACK corresponding to slot #(n–k). For example, when k∈{1, 2, 3, 4, 5, 6, 7, 8}, the HARQ-ACK information of slot #n may include HARQ-ACK corresponding to slot #(n–8) to slot #(n–1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. The semi-static HARQ-ACK codebook is referred to as a Type-1 HARQ-ACK codebook. For the Type 1 HARQ-ACK codebook, the number of bits to be transmitted in a HARQ-ACK report is fixed and may be potentially large. If many cells are configured but only few cells are scheduled, the Type-1 HARQ-ACK codebook may be inefficient.

In the case of the dynamic HARQ-ACK codebook, the HARQ-ACK payload size that the UE is to report may be dynamically changed by the DCI etc. The dynamic HARQ-ACK codebook is referred to as a Type-2 HARQ-ACK codebook. The Type-2 HARQ-ACK codebook may be considered as optimized HARQ-ACK feedback because the UE sends feedback only for scheduled serving cells. However, in poor channel conditions, the UE may erroneously determine the number of scheduled serving cells. To solve this problem, a downlink assignment index (DAI) may be included as a part of DCI. For example, in the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the case of a HARQ-ACK codebook based on HARQ processes, the HARQ-ACK payload is determined based on all HARQ processes of all configured (or activated) serving cells in a PUCCH group. For example, the size of the HARQ-ACK payload to be reported by the UE using the HARQ-ACK codebook based on HARQ processes may be determined based on the number of all configured or activated serving cells in the PUCCH group configured for the UE and the number of HARQ processes for the serving cells. The HARQ-ACK codebook based on HARQ processes is also referred to as a Type-3 HARQ-ACK codebook. The type-3 HARQ-ACK codebook may be applied to one-shot feedback.

In some scenarios, PUCCH feedback based on a subslot consisting of fewer (e.g., 2 or 7 OFDM symbols) than 14 OFDM symbols as well as PUCCH feedback based on a slot consisting of 14 OFDM symbols may be considered.

Separate codebooks may be formed/generated for HARQ-ACK feedback for a plurality of DL data channels (e.g., a plurality of PDSCHs) having different service types, quality of service (QoS), latency requirements, reliability requirements, and/or priorities. For example, a HARQ-ACK codebook for PDSCH(s) associated with a high priority and a HARQ-ACK codebook for PDSCH(s) associated with a low priority may be separately configured/formed. For HARQ-ACK feedback for PDSCHs with different priorities, different parameters and resource configurations may be considered for PUCCH transmissions with different priorities (see information element (IE) pucch-ConfigurationList of 3GPP TS 38.331). For example, if the UE is provided with pdsch-HARQ-ACK-CodebookList through RRC signaling, the UE may be indicated by pdsch-HARQ-ACK-CodebookList to generate one or multiple HARQ-ACK codebooks. When the UE is indicated to generate one HARQ-ACK codebook, the HARQ-ACK codebook is associated with a PUCCH of priority index 0. When the UE is provided with pdsch-HARQ-ACK-CodebookList, the UE multiplexes only HARQ-ACK information associated with the same priority index with the same HARQ-ACK codebook. When the UE is indicated to generate two HARQ-ACK codebooks, the first HARQ-ACK codebook is associated with a PUCCH of priority index 0, and the second HARQ-ACK codebook is associated with a PUCCH of priority index 1.

The unit of the time difference (e.g., a PDSCH-to-HARQ feedback timing indicator) from a DL data channel to a PUCCH for HARQ-ACK feedback transmission may be determined by a predetermined subslot length (e.g., the number of symbols included in a subslot). For example, the unit of the time difference from the DL data channel to the PUCCH for HARQ-ACK feedback transmission may be configured by a parameter subslotLengthForPUCCH in PUCCH-Config, which is configuration information used to configure UE-specific PUCCH parameters. According to these scenarios, the length unit of the PDSCH-to-HARQ feedback timing indicator may be configured for each HARQ-ACK codebook.

In some scenarios, it is not allowed that PDSCH reception for a HARQ process and its HARQ-ACK transmission are performed out of order. This is one of the methods in which the UE and BS assume the same PUCCH transmission time so that the BS is allowed to successfully receive a PUCCH transmitted from the BS[정은1]. In these scenarios, for example, PDSCH(s) need to be scheduled such that HARQ-ACK transmission for the first received PDSCH ends before HARQ-ACK transmission for the later received PDSCH. In these scenarios, it is regulated that for any HARQ process ID(s) in a given scheduled cell, the UE is not expected to receive a PDSCH that overlaps in time with another PDSCH. In addition, in these scenarios, it is regulated that the UE is not expected to receive another PDSCH for a given HARQ process until after the end of the expected transmission of the HARQ-ACK for the HARQ process.

Figure 9:
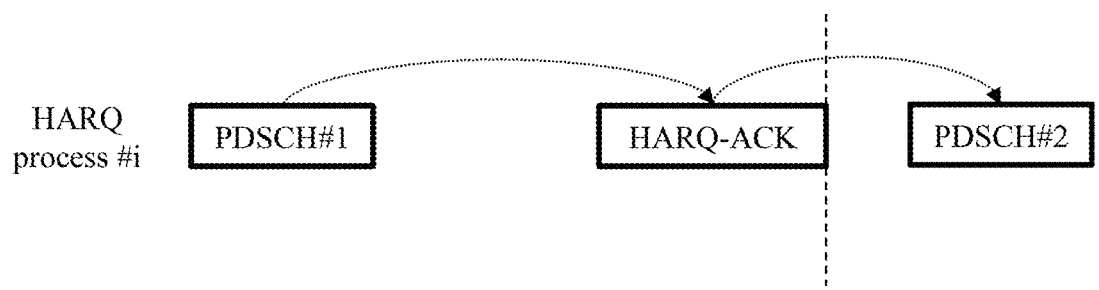
FIG. 9 illustrates an example of scheduling constraint according to some scenarios.

FIG. 9 illustrates an example of scheduling constraint according to some scenarios.

Referring to FIG. 9, for example, in some scenarios, upon receiving PDSCH #1 for HARQ process #i, the UE may not be expected to receive another PDSCH (e.g., PDSCH #2 in FIG. 9) for HARQ process #i before the end of HARQ-ACK transmission for PDSCH #1. That is, the UE may be expected to receive the other PDSCH for HARQ process #i only after the end of the HARQ-ACK transmission for PDSCH #1.

In some scenarios, UL or DL scheduling may be performed dynamically or semi-persistently. The BS may configure or indicate to the UE the transmission direction (e.g., DL, UL, or flexible) of each symbol semi-persistently based on a tdd-UL-DL-ConfigurationCommon or tdd-UL-DL-ConfigurationDedicated message or dynamically based on DCI format 2_0. The configured/indicated UL or DL scheduling may be canceled by the configured/indicated transmission direction.

Figure 10:
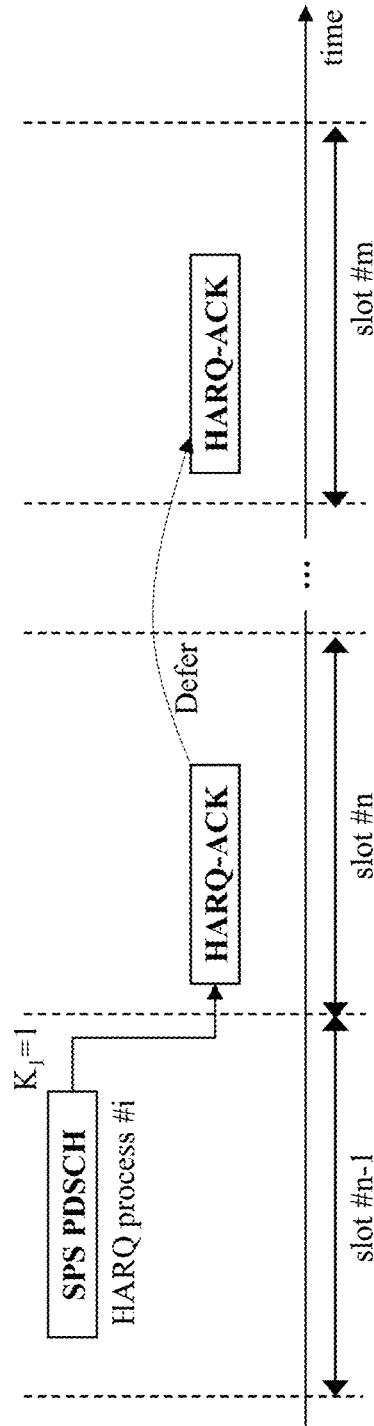
FIG. 10 illustrates an example of HARQ-ACK deferral.

FIG. 10 illustrates an example of HARQ-ACK deferral.

In some scenarios (e.g., 3GPP NR Rel-16), when the UE receives a PDSCH scheduled by the BS, the UE may transmit a PUCCH carrying a HARQ-ACK for the PDSCH (hereinafter, HARQ-ACK PUCCH) at a time designated by scheduling information on the PDSCH. However, these series of operations always cause the UE to transmit the PUCCH after a lapse of a predetermined time from reception of a semi-persistently configured SPS PDSCH. As a result, a TDD pattern that is not aligned with the periodicity of the SPS PDSCH may be used, PUCCH transmission may be easily canceled by the dynamic TDD operation of the BS, PDSCH transmission associated with the canceled PUCCH transmission may also be canceled, or retransmission may be requested. Accordingly, to solve these problems, an operation in which the UE defers a PUCCH timing determined for a PDSCH in a predetermined or arbitrary manner, that is, delaying operation is being considered. For example, when a PUCCH configured for transmission of a HARQ-ACK for an SPS PDSCH (hereinafter, SPS HARQ-ACK) is canceled by a configured or indicated transmission direction, HARQ-ACK deferral, which delays the HARQ-ACK transmission after the originally scheduled time, may be considered. Referring to FIG. 10, for example, when an SPS PDSCH in slot #n−1 uses HARQ process #i, and HARQ-ACK transmission for the SPS PDSCH is scheduled in slot #n, the UE may determine to defer a PUCCH in slot #n for the HARQ-ACK transmission for the SPS PDSCH to slot #m based on predetermined conditions. Due to such HARQ-ACK deferral, even if PUCCH transmission is canceled, the UE and BS may transmit/receive HARQ-ACK information for the SPS PDSCH later.

However, according to the scheduling constraint based on the scenarios described in FIG. 9, retransmission of the SPS PDSCH also needs to be performed after the HARQ-ACK transmission. Thus, if the HARQ-ACK deferral is performed for the HARQ-ACK for the SPS PDSCH, the HARQ-ACK may be transmitted at a later time than the expected time, and as a result, a large delay may occur in the SPS PDSCH retransmission.

Considering these problems, implementations in which the UE performs new PDSCH reception for an associated HARQ process and HARQ-ACK transmission for the corresponding PDSCH reception when the UE delays a part of PUCCH transmission for SPS so the interval between a PDSCH reception timing and a HARQ-ACK transmission timing increases will be described.

Specifically, implementations in which the UE and BS select another UL channel (e.g., PUCCH) to transmit SPS HARQ-ACK information over the other UL channel when PUCCH transmission for the SPS HARQ-ACK information at the UE is canceled will be described. In addition, implementations for multiplexing the SPS HARQ-ACK information with existing UCI will also be described. According to some implementations of the present disclosure, the BS may more freely provide TDD UL-DL configurations and SPS PDSCH resources to the UE. Even if a PUCCH for a given SPS PDSCH is unavailable due to TDD operation, the UE may provide a related SPS HARQ-ACK response to the BS based on available UL resources and channels according to some implementations of the present disclosure.

UE Side

Figure 11:
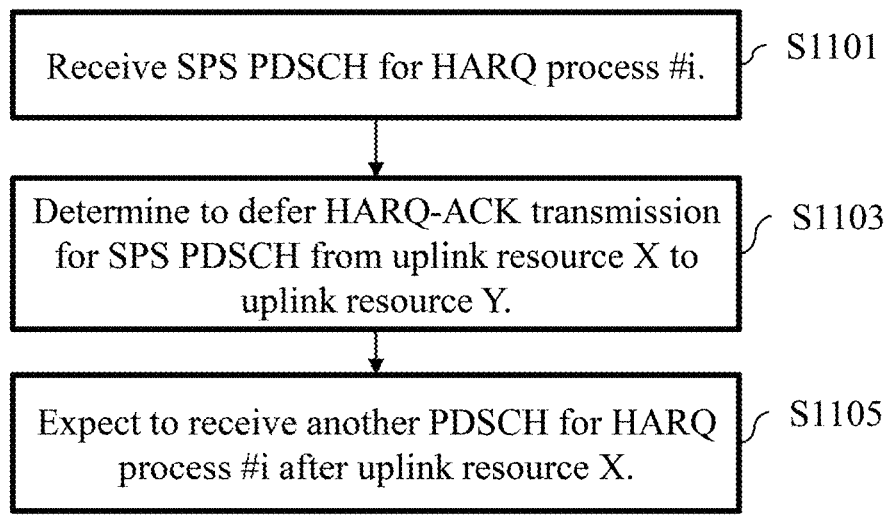
FIG. 11 illustrates an operational flow of a user equipment (UE) according to some implementations of the present disclosure.

FIG. 11 illustrates an operational flow of a UE according to some implementations of the present disclosure.

In some implementations of the present disclosure, when the UE delays HARQ-ACK transmission for an SPS PDSCH associated with a HARQ process from a time indicated or configured by the BS, the BS may cause the UE to receive another PDSCH for the same HARQ process through different PDSCH scheduling for the UE. In this case, in some implementations, the UE may drop the delayed HARQ-ACK transmission. Alternatively, in some implementations, the UE may multiplex the delayed HARQ-ACK transmission with other UCI or UL data.

The UE may receive a TDD configuration (e.g., tdd-UL-DL-ConfigurationCommon or tdd-UL-DLConfiguration-Dedicated) and an SPS radio resource configuration (e.g., SPS configuration) from the BS. The UE may receive an SPS PDSCH for HARQ processor #i on DL radio resources based on the TDD configuration and the SPS configuration (S1101). After receiving the SPS PDSCH for HARQ process #i, the UE may determine to perform HARQ-ACK transmission for the SPS PDSCH on another available PUCCH resource or available UL resource Y if PUCCH resource X associated with the SPS PDSCH includes DL radio resources (S1103). The UE may be expected to receive new PDSCH scheduling information for HARQ process #i of the SPS PDSCH after PUCCH resource X. The UE may be expected to receive another PDSCH for HARQ process #i of the SPS PDSCH after PUCCH resource X (S1105).

When the UE receives the new PDSCH scheduling information and transmits HARQ-ACK information related thereto on PUCCH resource Z, the UE may determine HARQ-ACK information to be transmitted on UL resource Y and PUCCH resource Z according to some implementations of the present disclosure.

In some implementations of the present disclosure, the following UE operation(s) may be considered.

<Implementation A1> Fast (Re-)Transmission after Deferring PUCCH Transmission

The UE may receive a TDD configuration and a configuration related to SPS radio resources from the BS and perform SPS PDSCH reception on DL radio resources. After receiving an SPS PDSCH, the UE may perform HARQ-ACK transmission for the corresponding SPS PDSCH on another available PUCCH resource or available UL resource Y if related PUCCH resource X includes DL radio resources. The UE may be expected to receive new scheduling information for the HARQ process of the SPS PDSCH from or after PUCCH resource X.

In some implementations, the UE may be expected to receive the new scheduling information for the HARQ process of the SPS PDSCH, for example, at the following time points:

i) From slot #n+1 or subslot #n+1 if PUCCH resource X is indicated in slot #n or subslot #n;

ii) From the start symbol of PUCCH resource X;

iii) From the last symbol of PUCCH resource X; and iv) From the end of PUCCH resource X.

In some implementations, the new scheduling information for the HARQ process of the SPS PDSCH may be limited to retransmission of a transport block (TB) transmitted on the SPS PDSCH. For example, Implementation A1 may be limitedly applied when scheduling DCI indicating a new PDSCH is scrambled with a CS-RNTI and the NDI value is indicated as 1. For example, in some implementations, when scheduling DCI indicating a new PDSCH for a HARQ process associated with delayed HARQ-ACK transmission is scrambled with a CS-RNTI and the NDI value is indicated as 1, the UE may be expected to receive the scheduling DCI if the transmission time before the delay of the HARQ-ACK transmission ends even before the end of the transmission time after the delay of the HARQ-ACK transmission.

In some implementations, the new scheduling information may include information for changing the TB for the corresponding HARQ process or the associated HARQ information, for example, information for changing at least one of the received coded bit, last received RV, received TB, indicated MCS value, TB length, NDI value, HARQ-ACK transmission timing, or PUCCH resource indicator value.

Figure 12:
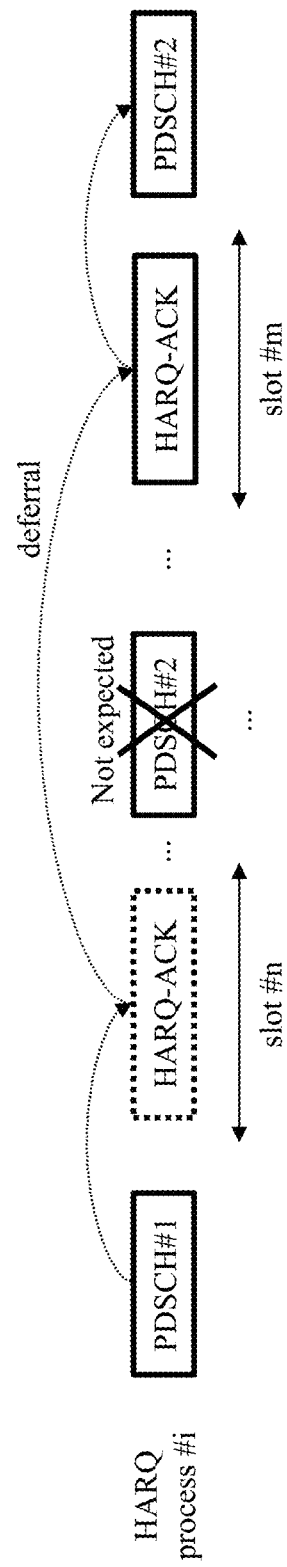
FIG. 12 illustrates another example of scheduling constraint according to some scenarios.

FIG. 12 illustrates another example of scheduling constraint according to some scenarios. In particular, FIG. 12 shows a relationship between PDSCH reception times for the same HARQ process and a transmission time for HARQ-ACK when HARQ-ACK deferral is performed in some scenarios where out-of-order HARQ transmissions are not allowed.

In some scenarios, the UE is not allowed to perform PDSCH reception for one HARQ process and its HARQ-ACK transmission out of order. For example, the UE is not expected to receive another PDSCH for a given HARQ process until after the end of the expected transmission of the HARQ-ACK for the HARQ process (see FIG. 9). In a given scheduled cell, the UE is not expected to (simultaneously) receive a first PDSCH and a second PDSCH, which starts later than the first PDSCH, with its corresponding HARQ-ACK assigned to be transmitted on a resource ending before the start of a different resource for the HARQ-ACK assigned to be transmitted for the first PDSCH, where the two resources are in different slots for the associated HARQ-ACK receptions, each slot is composed of 14 symbols or a number of symbols indicated by subslotLengthForPUCCH if provided, and the HARQ-ACKs for the two PDSCHs are associated with the HARQ-ACK codebook of the same priority. In a given scheduled cell, the UE is not expected to (simultaneously) receive a first PDSCH and a second PDSCH, which starts later than the first PDSCH, with its corresponding HARQ-ACK assigned to be transmitted on a resource ending before the start of a different resource for the HARQ-ACK assigned to be transmitted for the first PDSCH if the HARQ-ACKs for the two PDSCHs are associated with HARQ-ACK codebooks of different priorities.

Referring to FIG. 12, when HARQ-ACK transmission for PDSCH #1 based on HARQ process #i is delayed from slot #n to slot #m, which is behind slot #n, by HARQ-ACK deferral, the UE is not expected to receive another PDSCH for the same HARQ process #i before the end of the expected HARQ-ACK transmission in slot #m. That is, the UE is expected to receive the other PDSCH for the same HARQ process #i only after the end of the expected HARQ-ACK transmission in slot #m.

However, in some implementations of the present disclosure, the following may be considered for faster retransmission or new transmission. For transmission of a HARQ-ACK response dropped due to collision with a DL symbol and/or a HARQ-ACK response of low priority canceled due to collision with UL control information of high priority (and a HARQ process ID related thereto), the UE may be exceptionally 1): allowed to perform operation(s) of PDSCH (re-)transmission/reception for the same HARQ process ID and related HARQ-ACK transmission even before a corresponding HARQ-ACK transmission is performed over a PUCCH or Type-3 codebook into which the dropped and/or canceled HARQ-ACK transmission is delayed to be loaded; and 2) relaxed to determine the out-of-order HARQ restriction predefined for a HARQ process ID based on a HARQ-ACK transmission time indicated/configured before the dropping/cancellation (rather than the actual HARQ-ACK transmission time (e.g., the delayed HARQ-ACK transmission time)).

In other words, in some implementations of the present disclosure, for transmission of a HARQ-ACK response dropped due to collision with a DL symbol and/or a HARQ-ACK response of low priority canceled due to collision with UL control information of high priority (and a HARQ process ID related thereto), the following may be exceptionally considered: 1) operations(s) of performing PDSCH (re-)transmission/reception for the same HARQ process ID and related A/N feedback transmission are allowed even before a corresponding A/N feedback is transmitted over a PUCCH or Type-3 codebook into which the dropped and/or canceled A/N feedback is delayed to be loaded; and 2) determination of whether HARQs for the same HARQ process ID are out of order is relaxed such that the determination is made based on a A/N transmission time indicated/configured before the dropping/cancellation (rather than the actual A/N transmission time (e.g., the delayed HARQ-ACK transmission time)).

Figure 13:
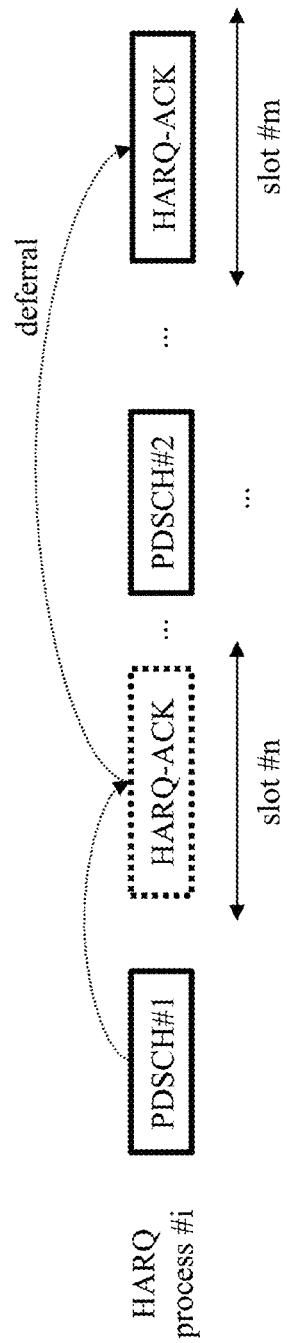
FIG. 13 illustrates an example of HARQ timing according to some implementations of the present disclosure.

FIG. 13 illustrates an example of HARQ timing according to some implementations of the present disclosure. In particular, FIG. 13 shows a relationship between PDSCH reception times for the same HARQ process and a transmission time for HARQ-ACK when HARQ-ACK deferral is performed.

Referring to FIG. 13, when HARQ-ACK transmission for PDSCH #1 based on HARQ process #i is delayed from slot #n to slot #m, which is behind slot #n, by HARQ-ACK deferral, the UE may be expected to receive another PDSCH for the same HARQ process #i after the end of the expected HARQ-ACK transmission in slot #n even before the end of the expected HARQ-ACK transmission in slot #m according to some implementations of the present disclosure.

However, the UE is not expected to receive the other PDSCH for the same HARQ process #i before the end of the expected HARQ-ACK transmission in slot #n. That is, the UE may be expected to receive the other PDSCH for the same HARQ process #i at the earliest only after the end of the expected HARQ-ACK transmission in slot #n. Here, the other PDSCH may be a PDSCH corresponding to retransmission of PDSCH #1 or a new PDSCH different from PDSCH #1. In some implementations, when it is said that the UE is expected to receive the other PDSCH for the same HARQ process #i only after the end of the expected HARQ-ACK transmission in slot #n, it may mean that the UE does not receive the other PDSCH using the same HARQ process #i before the end of the expected HARQ-ACK transmission in slot #m. Alternatively, when it is said that the UE is expected to receive the other PDSCH for the same HARQ process #i only after the end of the expected HARQ-ACK transmission in slot #n, it may mean that even if the UE receives the other PDSCH using the same HARQ process #i before the end of the expected HARQ-ACK transmission in slot #n, the UE does not decode the other PDSCH, transmits no HARQ-ACK therefor, or determines that there is an error. Alternatively, when it is said that the UE is expected to receive the other PDSCH using the same HARQ process #i only after the end of the expected HARQ-ACK transmission in slot #n, it may mean that even if the UE receives scheduling information indicating that the other PDSCH using the same HARQ process #i is transmitted before the end of the HARQ-ACK transmission, the UE determines that the scheduling information is invalid.

<Implementation A1-1> HARQ-ACK Response for Fast (Re-)Transmission

Regarding Implementation A1, the following may further be considered. If scheduling of a new dynamic PDSCH for a HARQ process associated with HARQ-ACK transmission X and HARQ-ACK transmission Y therefor are indicated before delayed HARQ-ACK transmission X for an SPS PDSCH as in Implementation A1, the UE may perform HARQ-ACK transmission X and/or HARQ-ACK transmission Y according to the following alternative(s). For example, when HARQ-ACK transmission for PDSCH #1 based on HARQ process #i is delayed from slot #n to slot #m, which is behind slot #n, by HARQ-ACK deferral, if the UE receives scheduling information on a new dynamically scheduled PDSCH (hereinafter, dynamic PDSCH) for HARQ process #i and HARQ-ACK transmission Y for the dynamic PDSCH before expected HARQ-ACK transmission X in slot #m, the UE may perform HARQ-ACK transmission X and HARQ-ACK transmission Y according to the following alternative(s).

- Alternative 1: If HARQ-ACK transmission X and HARQ-ACK transmission Y are HARQ-ACK responses for the same TB, the UE performs both HARQ-ACK transmission X and HARQ-ACK transmission Y. In this case, the latest decoding result(s) of the corresponding HARQ process may be reported as feedback values based on the transmission times of HARQ-ACK transmission X and HARQ-ACK transmission Y, respectively. Alternative 1 may be used to improve HARQ-ACK reliability.
- Alternative 1-1: If HARQ-ACK transmission X and HARQ-ACK transmission Y are HARQ-ACK responses for the same TB, the UE performs both HARQ-ACK transmission X and HARQ-ACK transmission Y. In this case, a value based on the decoding result of the SPS PDSCH may be used as a feedback value for HARQ-ACK transmission X, and a value based on the decoding result of the dynamic PDSCH may be used as a feedback value for HARQ-ACK transmission Y.
- Alternative 2: If HARQ-ACK transmission X and HARQ-ACK transmission Y are HARQ-ACK responses for the same TB, the UE may perform only HARQ-ACK transmission Y without performing HARQ-ACK transmission X. Alternative 2 may be limitedly applied when HARQ-ACK transmission X is a sole HARQ-ACK feedback on a UL resource where HARQ-ACK transmission X is performed. For example, Alternative 2 may be limitedly applied when HARQ-ACK transmission X is not multiplexed with other HARQ-ACK transmissions on a PUCCH, that is, when there is no other HARQ-ACK information other than HARQ-ACK transmission X on the corresponding PUCCH. Alternative 2 may minimize the UE complexity and UL transmissions by the UE by allowing the UE to transmit only the latest decoding result.
- Alternative 3: If HARQ-ACK transmission X and HARQ-ACK transmission Y are HARQ-ACK responses for different TBs, the UE performs both HARQ-ACK transmission X and HARQ-ACK transmission Y. In this case, the latest decoding result(s) of the corresponding HARQ process may be reported as feedback values, respectively, based on the respective transmission times of HARQ-ACK transmission X and HARQ-ACK transmission Y The reported feedback values may be different or the same depending on the transmission times of HARQ-ACK transmission X and HARQ-ACK transmission Y For example, if PDSCH Y is received after reception of PDSCH X and decoding of a TB related to HARQ-ACK transmission Y is completed before HARQ-ACK transmission X, the HARQ-ACK for PDSCH X may not be transmitted, and the decoding result of PDSCH X may be reported as a feedback value in both HARQ-ACK transmission X and HARQ-ACK transmission Y. Alternative 3 may be used to improve HARQ-ACK reliability.

In some implementations, if transmission of a HARQ-ACK response for an SPS PDSCH is dropped, the corresponding SPS PDSCH for which the HARQ-ACK response transmission is dropped may not be considered during a construction procedure of a HARQ-ACK (sub-) codebook including only HARQ-ACK responses for SPS PDSCHs. For example, in the case of the SPS PDSCH for which the HARQ-ACK response transmission is dropped, even if a corresponding SPS PDSCH resource is valid (because there are no UL symbols or no UL transmissions), HARQ-ACK information on the SPS PDSCH may be excluded during formation/generation of a HARQ-ACK (sub-)codebook which is based on PDSCH occasions, and thus, the HARQ-ACK (sub-)codebook may not have a bit position associated with the SPS PDSCH resource.

BS Side

Some implementations of the present disclosure described above will be described again from the perspective of the BS.

Figure 14:
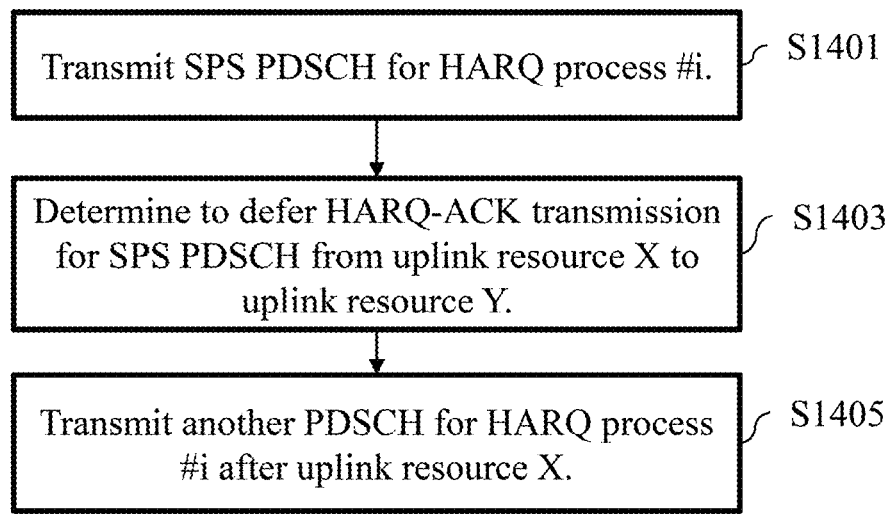
FIG. 14 illustrates an operational flow of a BS according to some implementations of the present disclosure.

FIG. 14 illustrates an operational flow of a BS according to some implementations of the present disclosure.

In some implementations of the present disclosure, when the UE delays HARQ-ACK transmission for an SPS PDSCH associated with a HARQ process from a time indicated or configured by the BS, the BS may transmit another PDSCH for the same HARQ process to the UE through different PDSCH scheduling for the UE. In this case, in some implementations, the BS may assume that the UE drops the delayed HARQ-ACK transmission. Alternatively, in some implementations, the BS may assume that the UE multiplexes the delayed HARQ-ACK transmission with other UCI or UL data.

The BS may transmit a TDD configuration (e.g., tdd-UL-DL-ConfigurationCommon or tdd-UL-DLConfiguration-Dedicated) and an SPS radio resource configuration (e.g., SPS configuration) to the UE. The BS may transmit an SPS PDSCH for HARQ processor #i to the UE on DL radio resources based on the TDD configuration and the SPS configuration (S1401). If PUCCH resource X associated with the SPS PDSCH for HARQ process #i includes DL radio resources, the BS may attempt to receive a HARQ-ACK for the SPS PDSCH by assuming that the UE will transmit the HARQ-ACK in another PUCCH resource or available UL resource Y (S1403). The BS may transmit new PDSCH scheduling information for HARQ process #i of the SPS PDSCH after the PUCCH resource X. The BS may transmit another PDSCH for HARQ process #i of the SPS PDSCH after PUCCH resource X (S1405).

When the UE receives the new PDSCH scheduling information and transmits HARQ-ACK information related thereto on PUCCH resource Z, the BS may assume that the UE will determine HARQ-ACK information to be transmitted on UL resource Y and PUCCH resource Z according to some implementations of the present disclosure.

In some implementations of the present disclosure, the following BS operation(s) may be considered.

<Implementation B1> Fast (Re-)Transmission after Deferring PUCCH Transmission

The BS may transmit a TDD configuration and a configuration related to SPS radio resources to the UE and transmit an SPS PDSCH in DL radio resources. When PUCCH resource X associated with the SPS PDSCH includes DL radio resources, the BS may attempt to receive the HARQ-ACK for the SPS PDSCH by assuming that the UE will transmit the HARQ-ACK for the corresponding SPS PDSCH on another available PUCCH resource or available UL resource Y. The BS may transmit new scheduling information for the HARQ process of the SPS PDSCH from or after PUCCH resource X.

In some implementations, the BS may transmit the new scheduling information for the HARQ process of the SPS PDSCH, for example, at the following time points:

i) From slot #n+1 or subslot #n+1 if PUCCH resource X is indicated in slot #n or subslot #n;
ii) From the start symbol of PUCCH resource X;
iii) From the last symbol of PUCCH resource X; and
iv) From the end of PUCCH resource X.

In some implementations, the new scheduling information for the HARQ process of the SPS PDSCH may be limited to retransmission of a TB transmitted on the SPS PDSCH. For example, Implementation A1[정은2] may be limitedly applied when scheduling DCI indicating a new PDSCH is scrambled with a CS-RNTI and the NDI value is indicated as 1. For example, in some implementations, when scheduling DCI indicating a new PDSCH for a HARQ process associated with delayed HARQ-ACK transmission is scrambled with a CS-RNTI and the NDI value is indicated as 1, the UE[정은3] may transmit the scheduling DCI if the transmission time before the delay of the HARQ-ACK transmission ends even before the end of the transmission time after the delay of the HARQ-ACK transmission.

In some implementations, the new scheduling information may include information for changing the TB for the corresponding HARQ process or the associated HARQ information, for example, information for changing at least one of the received coded bit, last received RV, received TB, indicated MCS value, TB length, NDI value, HARQ-ACK transmission timing, or PUCCH resource indicator value.

In some scenarios, the BS is not allowed to perform PDSCH transmission for one HARQ process and HARQ-ACK reception. For example, the BS is not allowed to transmit another PDSCH for a given HARQ process until after the end of the expected reception of the HARQ-ACK for the HARQ process (see FIG. 9). In a given scheduled cell, the BS is not allowed to (simultaneously) transmit a first PDSCH and a second PDSCH, which starts later than the first PDSCH, with its corresponding HARQ-ACK assigned to be received on a resource ending before the start of a different resource for the HARQ-ACK assigned to be received for the first PDSCH, where the two resources are in different slots for the associated HARQ-ACK receptions, each slot is composed of 14 symbols or a number of symbols indicated by subslotLengthForPUCCH if provided, and the HARQ-ACKs for the two PDSCHs are associated with the HARQ-ACK codebook of the same priority. In a given scheduled cell, the UE[정은4] is not allowed to (simultaneously) transmit a first PDSCH and a second PDSCH, which starts later than the first PDSCH, with its corresponding HARQ-ACK assigned to be received on a resource ending before the start of a different resource for the HARQ-ACK assigned to be received for the first PDSCH if the HARQ-ACKs for the two PDSCHs are associated with HARQ-ACK codebooks of different priorities.

Referring to FIG. 12, when HARQ-ACK reception for PDSCH #1 based on HARQ process #i is delayed from slot #n to slot #m, which is behind slot #n, by HARQ-ACK deferral, the BS is not allowed to transmit another PDSCH for the same HARQ process #i before the end of the expected HARQ-ACK reception in slot #m. That is, the BS is allowed to transmit the other PDSCH for the same HARQ process #i only after the end of the expected HARQ-ACK reception in slot #m.

However, in some implementations of the present disclosure, the following may be considered for faster retransmission or new transmission. For reception of a HARQ-ACK response dropped due to collision with a DL symbol and/or a HARQ-ACK response of low priority canceled due to collision with UL control information of high priority (and a HARQ process ID related thereto), the BS may be exceptionally 1): allowed to perform operations(s) of PDSCH (re-)transmission for the same HARQ process ID and related HARQ-ACK reception even before a corresponding HARQ-ACK reception is performed over a PUCCH or Type-3 codebook into which the dropped and/or canceled HARQ-ACK reception is delayed to be loaded; and 2) relaxed to determine the predefined out-of-order HARQ restriction for one HARQ process ID based on a HARQ-ACK reception time indicated/configured before the dropping/cancellation (rather than the actual HARQ-ACK reception time (e.g., the delayed HARQ-ACK reception time)).

In other words, in some implementations of the present disclosure, for reception of a HARQ-ACK response dropped due to collision with a DL symbol and/or a HARQ-ACK response of low priority canceled due to collision with UL control information of high priority (and a HARQ process ID related thereto), the following may be exceptionally considered: 1) operations(s) of performing PDSCH (re-)transmission for the same HARQ process ID and related A/N feedback reception are allowed even before a corresponding A/N feedback is received over a PUCCH or Type-3 codebook into which the dropped and/or canceled A/N feedback is delayed to be loaded; and 2) determination of whether HARQs for the same HARQ process ID are out of order is relaxed that the determination is made based on a A/N reception time indicated/configured before the dropping/cancellation (rather than the actual A/N reception time (e.g., the delayed HARQ-ACK reception time)).

For example, referring to FIG. 13, when HARQ-ACK transmission for PDSCH #1 based on HARQ process #i is delayed from slot #n to slot #m, which is behind slot #n, by HARQ-ACK deferral, the BS may be allowed to transmit another PDSCH for the same HARQ process #i to the UE after the end of the expected HARQ-ACK reception in slot #n even before the end of the expected HARQ-ACK reception in slot #m according to some implementations of the present disclosure.

However, the BS is not allowed to transmit the other PDSCH for the same HARQ process #i before the end of the expected HARQ-ACK reception in slot #n. That is, the BS may be allowed to transmit the other PDSCH for the same HARQ process #i to the UE at the earliest only after the end of the expected HARQ-ACK reception in slot #n. Here, the other PDSCH may be a PDSCH corresponding to retransmission of PDSCH #1 or a new PDSCH different from PDSCH #1. In some implementations, when it is said that the BS is allowed to transmit the other PDSCH for the same HARQ process #i to the UE only after the end of the expected HARQ-ACK reception in slot #n, it may mean that the BS does not transmit the other PDSCH using the same HARQ process #i to the UE before the end of the expected HARQ-ACK reception in slot #m. Alternatively, when it is said that the BS is allowed to transmit the other PDSCH for the same HARQ process #i to the UE only after the end of the expected HARQ-ACK reception in slot #n, it may mean that even if the BS transmits the other PDSCH using the same HARQ process #i to the UE before the end of the expected HARQ-ACK reception in slot #n, the BS assumes that the UE may not decode the other PDSCH, may transmit no HARQ-ACK, or may determine that there is an error. Alternatively, when it is said that the BS is allowed to transmit the other PDSCH using the same HARQ process #i to the UE only after the end of the expected HARQ-ACK reception in slot #n, it may mean that even if the BS transmits to the UE scheduling information indicating that the other PDSCH using the same HARQ process #i is transmitted before the end of the HARQ-ACK transmission, the BS determines that the scheduling information is invalid and does not transmit the other PDSCH <Implementation B1-1> HARQ-ACK Response for Fast (Re-)Transmission Regarding Implementation B1, the following may further be considered. If the BS indicates to the UE scheduling of a new dynamic PDSCH for a HARQ process associated with HARQ-ACK transmission X and HARQ-ACK transmission Y therefor before delayed HARQ-ACK transmission X for an SPS PDSCH, the BS[정은s] may perform HARQ-ACK transmission X and/or HARQ-ACK transmission Y according to the following alternative(s). For example, when HARQ-ACK reception for PDSCH #1 based on HARQ process #i is delayed from slot #n to slot #m, which is behind slot #n, by HARQ-ACK deferral, if the BS transmits to the UE scheduling information on a dynamic PDSCH for HARQ process #i and HARQ-ACK transmission Y for the dynamic PDSCH before expected HARQ-ACK reception X in slot #m, the BS may attempt to receive UCI by assuming that the UE will perform HARQ-ACK transmission X and HARQ-ACK transmission Y according to the following alternative(s).

Alternative 1: If HARQ-ACK transmission X and HARQ-ACK transmission Y are HARQ-ACK responses for the same TB, the UE performs both HARQ-ACK transmission X and HARQ-ACK transmission Y. In this case, the latest decoding result(s) of the corresponding HARQ process may be reported as feedback values based on the transmission times of HARQ-ACK transmission X and HARQ-ACK transmission Y, respectively. Alternative 1 may be used to improve HARQ-ACK reliability.

Alternative 1-1: If HARQ-ACK transmission X and HARQ-ACK transmission Y are HARQ-ACK responses for the same TB, the UE performs both HARQ-ACK transmission X and HARQ-ACK transmission Y. In this case, a value based on the decoding result of the SPS PDSCH may be used as a feedback value for HARQ-ACK transmission X, and a value based on the decoding result of the dynamic PDSCH may be used as a feedback value for HARQ-ACK transmission Y.

Alternative 2: If HARQ-ACK transmission X and HARQ-ACK transmission Y are HARQ-ACK responses for the same TB, the UE may perform only HARQ-ACK transmission Y without performing HARQ-ACK transmission X. Alternative 2 may be limitedly applied when HARQ-ACK transmission X is a sole HARQ-ACK feedback on a UL resource where HARQ-ACK transmission X is performed. For example, Alternative 2 may be limitedly applied when HARQ-ACK transmission X is not multiplexed with other HARQ-ACK transmissions on a PUCCH, that is, when there is no other HARQ-ACK information other than HARQ-ACK transmission X on the corresponding PUCCH. Alternative 2 may minimize the UE complexity and UL transmissions by the UE by allowing the UE to transmit only the latest decoding result.

Alternative 3: If HARQ-ACK transmission X and HARQ-ACK transmission Y are HARQ-ACK responses for different TBs, the UE performs both HARQ-ACK transmission X and HARQ-ACK transmission Y. In this case, the latest decoding result(s) of the corresponding HARQ process may be reported as feedback values, respectively, based on the respective transmission times of HARQ-ACK transmission X and HARQ-ACK transmission Y The reported feedback values may be different or the same depending on the transmission times of HARQ-ACK transmission X and HARQ-ACK transmission Y For example, if PDSCH Y is received after reception of PDSCH X and decoding of a TB related to HARQ-ACK transmission Y is completed before HARQ-ACK transmission X, the HARQ-ACK for PDSCH X may not be transmitted, and the decoding result of PDSCH X may be reported as a feedback value in both HARQ-ACK transmission X and HARQ-ACK transmission Y. Alternative 3 may be used to improve HARQ-ACK reliability.

In some implementations, if transmission of a HARQ-ACK response for an SPS PDSCH is dropped, the corresponding SPS PDSCH for which the HARQ-ACK response transmission is dropped may not be considered during a construction procedure of a HARQ-ACK (sub-) codebook including only HARQ-ACK responses for SPS PDSCHs. For example, in the case of the SPS PDSCH for which the HARQ-ACK response transmission is dropped, even if a corresponding SPS PDSCH resource is valid (because there are no UL symbols or no UL transmissions), HARQ-ACK information on the SPS PDSCH may be excluded during formation/generation of a HARQ-ACK (sub-)codebook which is based on PDSCH occasions, and thus, the HARQ-ACK (sub-)codebook may not have a bit position associated with the SPS PDSCH resource.

In some implementations of the present disclosure, the BS may provide the UE with an RRC configuration for slot format determination based on an SPS PDSCH and TDD operation. The BS may provide one or more SPS PDSCH configurations to the UE, and the UE may receive an SPS PDSCH based on the SPS PDSCH configurations and perform PUCCH transmission associated therewith. When the PUCCH transmission of the UE is canceled, the UE may delay the corresponding PUCCH transmission, and the BS may indicate new scheduling for an associated HARQ process from and after a PUCCH resource for the canceled PUCCH transmission. In some implementations of the present disclosure, the UE may receive one or more pieces of scheduling for one HARQ process before a HARQ-ACK response. The UE may perform HARQ-ACK PUCCH transmission including the HARQ-ACK response and/or HARQ-ACKs associated with the one or more pieces of scheduling.

According to some implementations of the present disclosure, when PUCCH transmission of the UE is canceled, the BS may schedule and transmit a new PDSCH resource capable of improving the reception reliability of an associated PDSCH. According to some implementations of the present disclosure, when PUCCH transmission is delayed, the UE may rapidly receive PDSCH retransmission, thereby reducing a DL delay time.

For receiving a DL channel, a UE may perform operations according to some implementations of the present disclosure. The UE may include: at least one transceiver; at least one processor; and at least one computer memory operably connected to the at least one processor and configured to store instructions that, when executed, cause the at least one processor to perform the operations according to some implementations of the present disclosure. A processing device for a UE may include: at least one processor; and at least one computer memory operably connected to the at least one processor and configured to store instructions that, when executed, cause the at least one processor to perform the operations according to some implementations of the present disclosure. A computer-readable (non-transitory) storage medium may store at least one computer program including instructions that, when executed by at least one processor, cause the at least one processor to perform the operations according to some implementations of the present disclosure. A computer program or computer program product may include instructions stored on at least one computer-readable (non-volatile) storage medium and, when executed, cause (at least one processor) to perform the operations according to some implementations of the present disclosure.

For the UE, processing device, computer-readable (non-volatile) storage medium, and/or computer program product, the operations may include: determining a first transmission time for a first HARQ-ACK for a first DL channel associated with a first HARQ process; and receiving a second DL channel associated with the first HARQ process. Receiving the second DL channel for the first HARQ process may include: receiving the second DL channel after the first transmission time based on the first HARQ-ACK being not subject to HARQ deferral; and receiving the second DL channel after a second transmission time based on the first HARQ-ACK being subject to the HARQ deferral and the first transmission time being determined by the HARQ deferral from the second transmission time earlier than the first transmission time.

In some implementations, based on the first HARQ-ACK being subject to the HARQ deferral and the first transmission time is determined by the HARQ deferral from the second transmission time, the second DL channel may be received before the end of the first transmission time.

In some implementations, the first DL channel may be an SPS based PDSCH.

In some implementations, the second DL channel may be for retransmission of a TB included in the SPS based PDSCH.

In some implementations, the second DL channel may be a dynamic scheduling based PDSCH.

In some implementations, the operations may include: determining a third transmission time for a second HARQ-ACK for the second DL channel; dropping transmission of the first HARQ-ACK within the first transmission time; and transmitting the second HARQ-ACK at the third transmission time.

For transmitting a DL channel, a BS may perform operations according to some implementations of the present disclosure. The BS may include: at least one transceiver; at least one processor; and at least one computer memory operably connected to the at least one processor and configured to store instructions that, when executed, cause the at least one processor to perform the operations according to some implementations of the present disclosure. A processing device for a BS may include: at least one processor; and at least one computer memory operably connected to the at least one processor and configured to store instructions that, when executed, cause the at least one processor to perform the operations according to some implementations of the present disclosure. A computer-readable (non-transitory) storage medium may store at least one computer program including instructions that, when executed by at least one processor, cause the at least one processor to perform the operations according to some implementations of the present disclosure. A computer program or computer program product may include instructions stored on at least one computer-readable (non-volatile) storage medium and, when executed, cause (at least one processor) to perform the operations according to some implementations of the present disclosure.

For the BS, processing device, computer-readable (non-volatile) storage medium, and/or computer program product, the operations may include: determining a first reception time for a first HARQ-ACK for a first DL channel associated with a first HARQ process; and transmitting a second DL channel associated with the first HARQ process. Transmitting the second DL channel for the first HARQ process may include: transmitting the second DL channel after the first reception time based on the first HARQ-ACK being not subject to HARQ deferral; and transmitting the second DL channel after a second reception time based on the first HARQ-ACK being subject to the HARQ deferral and the first reception time being determined by the HARQ deferral from the second reception time earlier than the first reception time.

In some implementations, based on the first HARQ-ACK being subject to the HARQ deferral and the first reception time being determined by the HARQ deferral from the second reception time, the second DL channel may be transmitted before an end of the first reception time.

In some implementations, the first DL channel may be an SPS based PDSCH.

In some implementations, the second DL channel may be for retransmission of a TB included in the SPS based PDSCH.

In some implementations, the second downlink channel may be a dynamic scheduling based PDSCH.

In some implementations, the operations may include: determining a third reception time for a second HARQ-ACK for the second downlink channel; skipping (omitting) reception of the first HARQ-ACK within the first transmission time; and receiving the second HARQ-ACK at the third reception time.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

What is claimed is:

1. A method of receiving a downlink channel by a user equipment (UE) in a wireless communication system, the method comprising:
   receiving, in a first reception time, a first physical downlink shared channel (PDSCH) associated with a first hybrid automatic repeat request (HARQ) process among a plurality of HARQ processes;
   transmitting, in a first transmission time, a first HARQ-acknowledgement (HARQ-ACK) for the first PDSCH associated with the first HARQ process; and
   receiving, in a second reception time, a second PDSCH for a same HARQ process identifier (ID) as the first HARQ process of the first PDSCH,
   wherein the second PDSCH for the same HARQ process ID as the first HARQ process of the first PDSCH is a PDSCH scheduled by downlink control information (DCI), and
   wherein receiving the second PDSCH for the same HARQ process ID as the first HARQ process of the first PDSCH comprises:
      receiving the second PDSCH, for the same HARQ process ID as the first HARQ process of the first PDSCH, in the second reception time which is after the first transmission time, based on the first HARQ-ACK being not subject to HARQ deferral; and
      receiving the second PDSCH, for the same HARQ process ID as the first HARQ process of the first PDSCH, in the second reception time which is after a second transmission time, based on the first HARQ-ACK being subject to the HARQ deferral and the first transmission time being determined by the HARQ deferral from the second transmission time earlier than the first transmission time.

2. The method of claim 1, wherein based on the first HARQ-ACK being subject to the HARQ deferral and the first transmission time being determined by the HARQ deferral from the second transmission time, the second PDSCH for the same HARQ process ID as the first HARQ process of the first PDSCH is received in the second reception time which is after the second transmission time and before an end of the first transmission time.

3. The method of claim 2, wherein the first PDSCH is a semi-persistent scheduling (SPS) based PDSCH.

4. The method of claim 3, wherein the second PDSCH is for retransmission of a transport block included in the SPS based PDSCH.

5. The method of claim 2, further comprising:
   determining a third transmission time for a second HARQ-ACK for the second PDSCH for the same HARQ process ID as the first HARQ process of the first PDSCH; and
   transmitting the second HARQ-ACK at the third transmission time.

6. A user equipment (UE) for receiving a downlink channel in a wireless communication system, the UE comprising:
   at least one transceiver;
   at least one processor; and
   at least one computer memory operably connected to the at least one processor and configured to store instructions that, when executed, cause the at least one processor to perform operations comprising:
      receiving, in a first reception time, a first physical downlink shared channel (PDSCH) associated with a first hybrid automatic repeat request (HARQ) process among a plurality of HARQ processes;
      transmitting, in a first transmission time, a first HARQ-acknowledgement (HARQ-ACK) for the first PDSCH associated with the first HARQ process; and
      receiving, in a second reception time, a second PDSCH for a same HARQ process identifier (ID) as the first HARQ process of the first PDSCH,
      wherein the second PDSCH for the same HARQ process ID as the first HARQ process of the first PDSCH is a PDSCH scheduled by downlink control information (DCI), and
      wherein receiving the second PDSCH for the same HARQ process ID as the first HARQ process of the first PDSCH comprises:
         receiving the second PDSCH, for the same HARQ process ID as the first HARQ process of the first PDSCH, in the second reception time which is after the first transmission time, based on the first HARQ-ACK being not subject to HARQ deferral; and
         receiving the second PDSCH, for the same HARQ process ID as the first HARQ process of the first PDSCH, in the second reception time which is after a second transmission time, based on the first HARQ-ACK being subject to the HARQ deferral and the first transmission time being determined by the HARQ deferral from the second transmission time earlier than the first transmission time.

7. A processing device configured to operate in a wireless communication system, the processing device comprising:
   at least one processor; and
   at least one computer memory operably connected to the at least one processor and configured to store instructions that, when executed, cause the at least one processor to perform operations comprising:
      receiving, in a first reception time, a first physical downlink shared channel (PDSCH) associated with a first hybrid automatic repeat request (HARQ) process among a plurality of HARQ processes;
      transmitting, in a first transmission time, a first HARQ-acknowledgement (HARQ-ACK) for the first PDSCH associated with the first HARQ process; and
      receiving, in a second reception time, a second PDSCH for a same HARQ process identifier (ID) as the first HARQ process of the first PDSCH,
      wherein the second PDSCH for the same HARQ process ID as the first HARQ process of the first PDSCH is a PDSCH scheduled by downlink control information (DCI), and
      wherein receiving the second PDSCH for the same HARQ process ID as the first HARQ process of the first PDSCH comprises:
         receiving the second PDSCH, for the same HARQ process ID as the first HARQ process of the first PDSCH, in the second reception time which is after the first transmission time, based on the first HARQ-ACK being not subject to HARQ deferral; and
         receiving the second PDSCH, for the same HARQ process ID as the first HARQ process of the first PDSCH, in the second reception time which is after a second transmission time, based on the first HARQ-ACK being subject to the HARQ deferral and the first transmission time being determined by the HARQ deferral from the second transmission time earlier than the first transmission time.

8. A method of transmitting a downlink channel by a base station (BS) to a user equipment (UE) in a wireless communication system, the method comprising:

transmitting, in a first transmission time, a first physical downlink shared channel (PDSCH) associated with a first hybrid automatic repeat request (HARQ) process among a plurality of HARQ processes;

receiving, in a first reception time, a first HARQ-acknowledgement (HARQ-ACK) for the first PDSCH associated with the first HARQ process; and transmitting, in a second transmission time, a second PDSCH for a same HARQ process identifier (ID) as the first HARQ process of the first PDSCH, wherein the second PDSCH for the same HARQ process ID as the first HARQ process of the first PDSCH is a PDSCH scheduled by downlink control information (DCI), and wherein transmitting the second PDSCH for the same HARQ process ID as the first HARQ process of the first PDSCH comprises:

transmitting the second PDSCH, for the same HARQ process ID as the first HARQ process of the first PDSCH, in the second transmission time which is after the first reception time, based on the first HARQ-ACK being not subject to HARQ deferral; and transmitting the second PDSCH, for the same HARQ process ID as the first HARQ process of the first PDSCH, in the second transmission time which is after a second reception time, based on the first HARQ-ACK being subject to the HARQ deferral and the first reception time being determined by the HARQ deferral from the second reception time earlier than the first reception time.

9. The method of claim 8, wherein based on the first HARQ-ACK being subject to the HARQ deferral and the first reception time being determined by the HARQ deferral from the second reception time, the second PDSCH for the same HARQ process ID as the first HARQ process of the first PDSCH is transmitted in the second transmission time which is after the second reception time and before an end of the first reception time.

10. The method of claim 9, wherein the first PDSCH is a semi-persistent scheduling (SPS) based PDSCH.

11. The method of claim 10, wherein the second PDSCH for the same HARQ process ID as the first HARQ process of the first PDSCH is for retransmission of a transport block included in the SPS based PDSCH.

12. The method of claim 9, further comprising:
determining a third reception time for a second HARQ-ACK for the PDSCH for the same HARQ process ID as the first HARQ process of the first PDSCH; and
receiving the second HARQ-ACK at the third reception time.

* * * * *